July 5, 1960　　　　　L. BESSON　　　　2,943,815
AERODYNES, MORE PARTICULARLY PILOTLESS AERODYNES
Filed Nov. 10, 1955　　　　　　　　　5 Sheets-Sheet 1

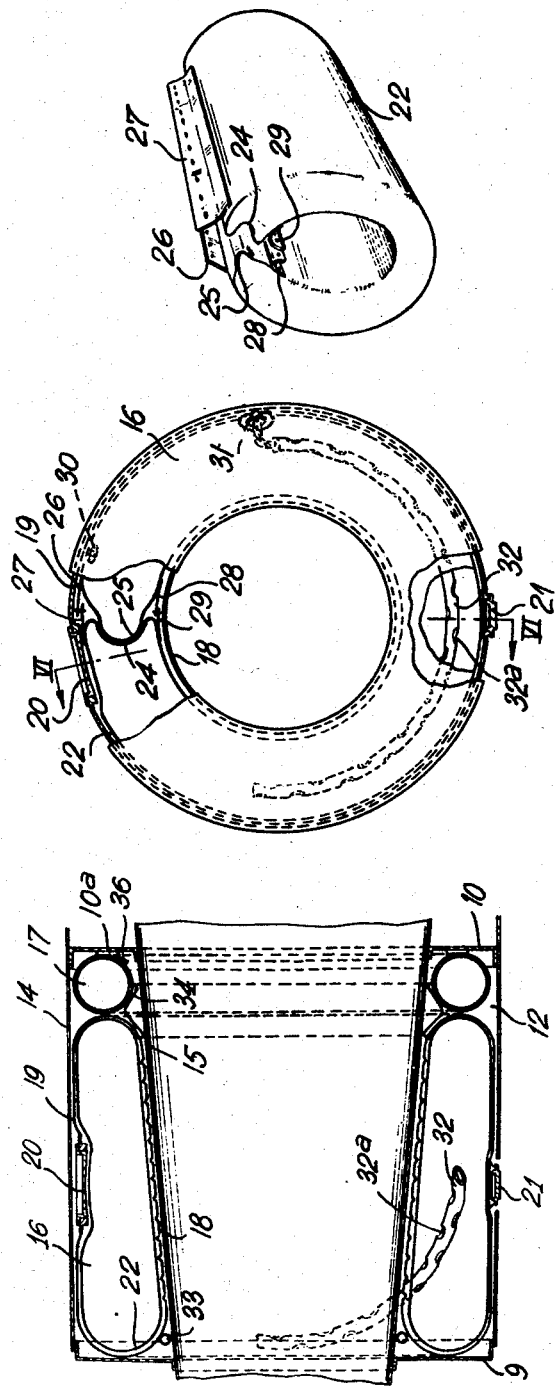

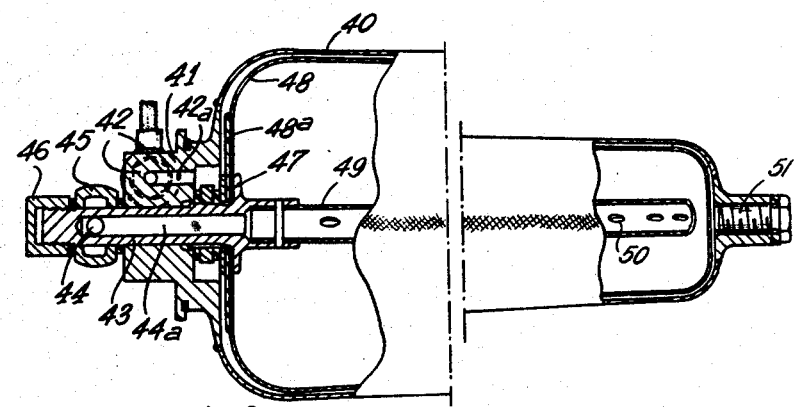
Fig.8.
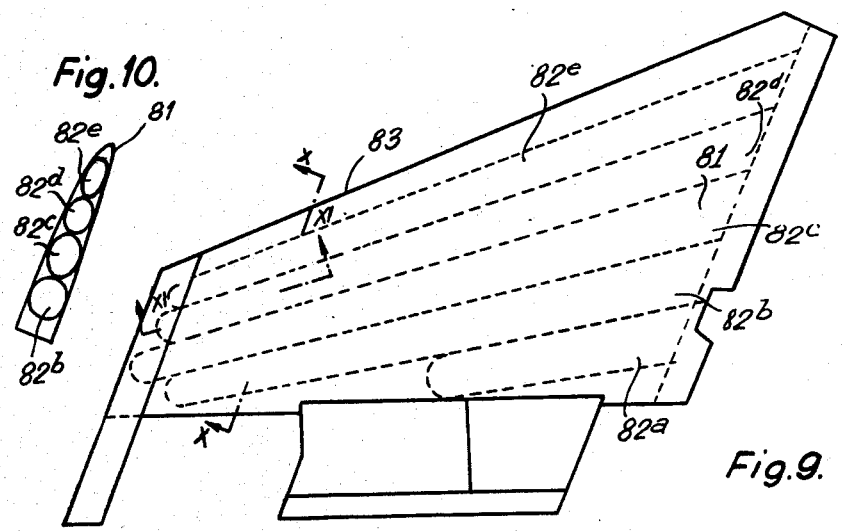
Fig.10.
Fig.9.
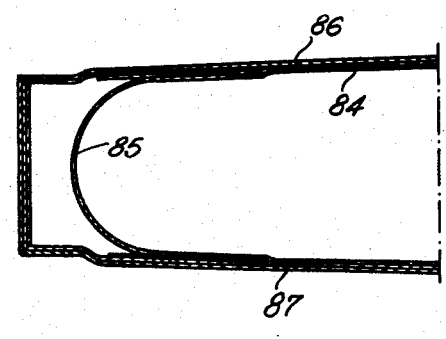
Fig.11.

United States Patent Office 2,943,815
Patented July 5, 1960

2,943,815
AERODYNES, MORE PARTICULARLY PILOTLESS AERODYNES

Louis Besson, Le Cannet, France, assignor to Sud-Aviation Societe Nationale de Constructions Aeronautiques, Paris, France Filed Nov. 10, 1955, Ser. No. 546,081

Claims priority, application France Nov. 19, 1954

20 Claims. (Cl. 244—14)

The present invention relates to improvements in aerodynes, and is more particularly concerned with pilotless jet-propelled aerodynes which may be used as missiles.

One of the problems encountered in designing pilotless jet-propelled aerodynes arises from the necessity of concentrating into a small space the equipments and the fuel and in addition, when said aerodynes are used as missiles, the charge to be carried, so as to obtain the smallest volume possible and thereby a very substantial reduction in weight, notably in order to improve the manoeuvrability of such missiles.

In order to obtain the maximum compactness of the equipments, the charge to be carried and the fuel, the present invention has for an object to provide a pilotless jet-propelled aerodyne which may be used as a missile, of the type having no tail and no landing gear, said aerodyne comprising a tunnel-shaped hollow fuselage having a torus-shaped front part and a pair of symmetrical monoplane wings, preferably substantially sweptback, the hollow, or tunneled, part of the fuselage constituting the housing of the jet engine and the space available in the torus-shaped part of the fuselage being used for housing the equipments, the charge to be carried and part of the fuel, whereas the space available in the wings is used for housing the rest of the fuel. In this way, the whole space defined by the torus-shaped part of the fuselage and the wings is used. Moreover, the aerodyne is thus built with three main structure members in a substantially simplified manner and its drag is reduced by the fact that it is designed without a nacelle for the propelling unit, the outer surface of the fuselage being substantially similar to that of a conventional jet engine nacelle. The compact arrangement of the equipments around the jet engine tunnel has the advantage of providing full accessibility and weight reduction.

The torus-shaped part of the fuselage is conveniently partitioned by structural members leaving a central chamber wherein is accommodated a main torus-shaped tank for the fuel which tank has an inner shape similar or substantially similar to the shape of the tunnel and an outer shape substantially similar to the shape of the fuselage.

Preferably, the torus-shaped part of the fuselage comprises a removable forward member consisting of a torus-shaped casing the inner surface of which bounds the forward portion of the tunnel and the outer surface of which is streamlined for forward movement through the air, said casing being used for accommodating measuring instruments, or an explosive material, or a fuel, the chamber provided between said removable forward casing and the main fuel tank being used for housing the various equipments of the aerodyne, such as regulating box, automatic pilot, telemeter, altimeter-barometer, radio receiver, and the like.

The wings are composite, made of wood, metal or plastics and are formed with hollow parts suitably disposed and arranged to easily accommodate a number of long tapering tanks the cross-section of which is preferably circular, but may be of any other shape such as polygonal or so curved as to occupy the greatest possible portion of the space left free by the wing structure.

In a preferred form of embodiment, the tunnel of the fuselage constitutes a ram-jet engine, the fuel being fed under pressure by means of low pressure air obtained by expanding compressed air stored in a torus-shaped tank of circular cross-section located, preferably at the rear of the main fuel tank within the central chamber. The torus-shaped compressed air tank conveniently forms the main frame of the fuselage and symmetrically carries the main fittings for the rear attachment of the wings, such a mounting being similar to that described in the co-pending U.S. patent application Serial No. 520,647 filed by applicant on July 8, 1955.

In the case of a ram-jet engine fed with fuel under pressure, the compressed air pressure after expansion acts within the main tank and the tanks accommodated in the wings on flexible fuel cells containing the fuel and having a shape conformed to said tanks, a perforated discharge hose extending throughout the length of said wing tanks and the lower portion of the main torus-shaped tank at the middle radius thereof.

Thus the tanks are sort of sealed pneumatic tanks the inside space of which is fully occupied by said cell when the latter is filled up with fuel, gasoline for example.

According to another preferred embodiment of the invention in the case of a moulded wing formed with one or more free spaces which are pressure tight or rendered pressure-tight, said free space or spaces are used directly as tanks to be provided with one or more flexible fuel cells conformed to their shapes, the compressed air, preferably, acting directly in the wing structure on the bladders containing the fuel.

Other features of the invention will be disclosed in the following description with reference to the accompanying drawings, which will make it better understood how the invention may be carried into practice. In the drawings:

Fig. 5 is a front view of the forward portion of the main fuel tank, partly broken away.

Fig. 6 is a section of Fig. 5 on the line VI—VI, with the tank mounted in the fuselage.

Fig. 7 is a perspective view, to a smaller scale, of the flexible cells housed within the main tank illustrated in Figs. 5 and 6, viewed from the rear.

Fig. 8 shows the two end portions of a wing tank, partly in section.

Fig. 9 is a plan view of a wing made of laminated plastic material.

Fig. 10 is a section of Fig. 9 on the line X—X.

Fig. 11 is a section of Fig. 9 on the line XI—XI, to a greater scale.

Figure 1:
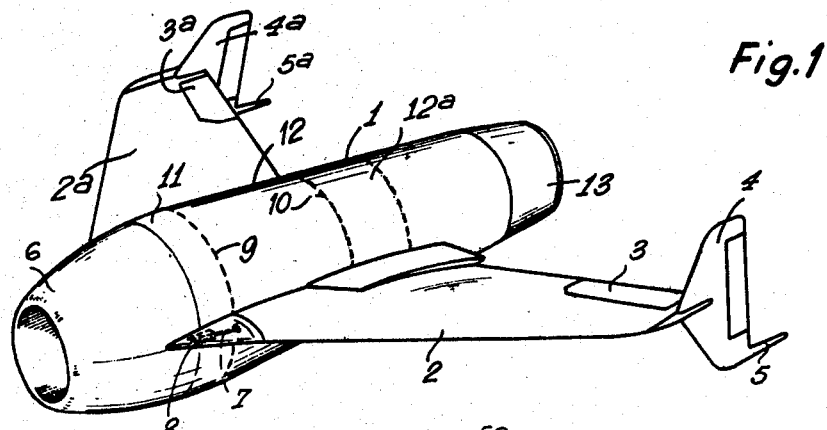
Fig. 1 is a perspective view of a pilotless jet-propelled aerodyne according to the invention.

The aerodyne illustrated in Fig. 1 is a pilotless jet-propelled aerodyne of the type having no tail and no landing gear. It consists of three main members, a hollow or tunneled fuselage 1 having a torus-shaped front part limited by the walls 14 and 15 and two symmetrical monoplane wings 2, 2a attached to said fuselage and highly sweptback. Said wings are provided with ailerons or flaps 3, 3a and of fin and control surfaces assemblies 4, 4a carrying members 5, 5a which may be either luminous tracing means or radio guiding antennae, or both combined. At the front of the torus-shaped part of fuselage 1 is mounted a torus-shaped container or hold 6 connected to said fuselage through quick-attaching means 7 covered by fairing elements 8.

The tunnel thus formed through the torus-shaped container 6 and fuselage 1 is designed to provide a ram-jet engine tunnel. The aerodyne equipped with such a ram-jet engine is launched, preferably, by means of auxiliary rockets or additional jet engines which are released as soon as the aerodyne speed has reached the normal operating speed of the ram-jet engine. Said rockets are conveniently secured on the aerodyne by means of any known or suitable automatically releasable locking device. The launching operation is in this case preferably made on a rising track or ramp.

In order to simplify the drawings and the description, the take-off rockets, their securing fittings and the launching ramp are not shown.

Figure 3:
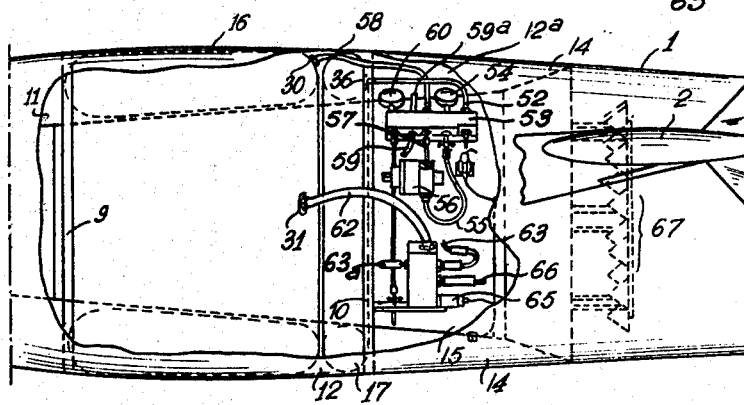
Fig. 3 is an elevational view showing the central portion of the aerodyne, the left wing skin and the fuselage shell being partly torn away.
Figure 4:
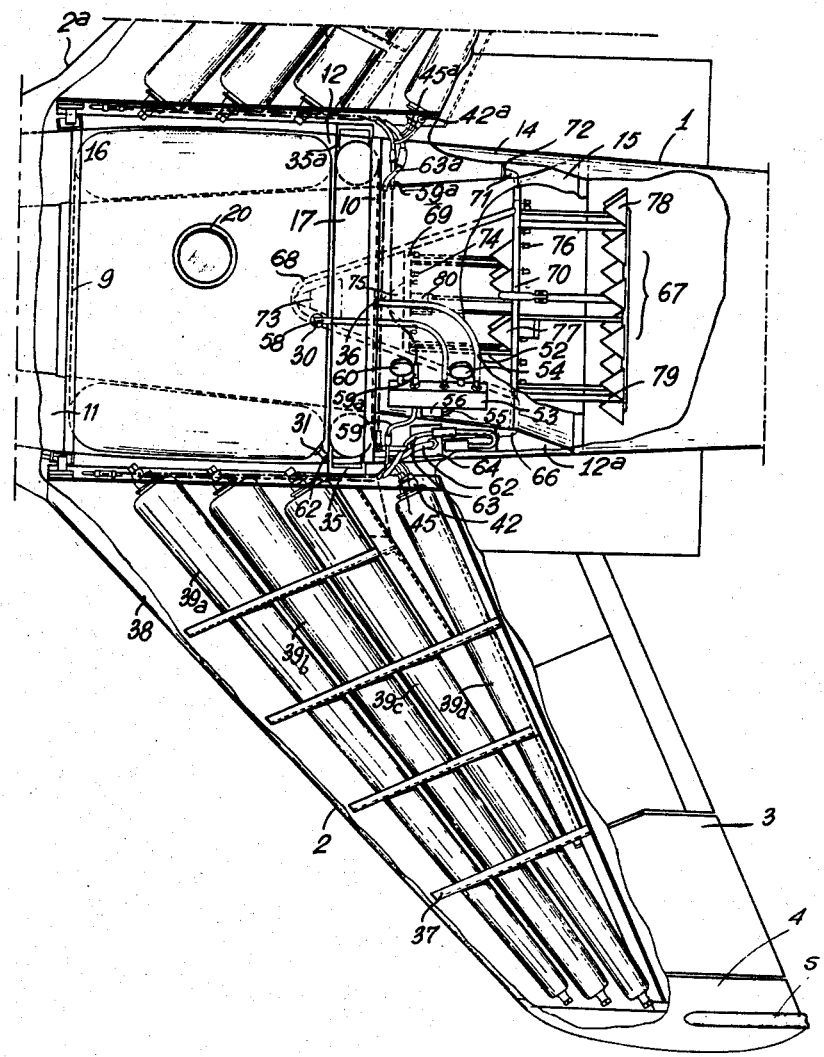
Fig. 4 is a plan view corresponding to Fig. 3, the wing skin and the fuselage shell, as well as the casing or tunnel of the ram-jet engine, being partly broken away, and the right wing cut away.

The torus-shaped part of the fuselage is partitioned by structure members comprising the front frame, not shown, against which bears the container 6, the frame 9 receiving the forward fixation of the wings and the main frame, formed by the air tank 17, receiving the rear fixation of the wings (Figs. 3, 4). The chambers thus defined comprise a forward chamber 11, next to the container 6, used for the accommodation around the ram-jet engine tunnel of the aircraft equipments including, for example, a regulating box, an automatic pilot, an altimeter-barometer, a telemeter device, a radio receiver and a gyrometer; a central chamber 12 used for housing the fuel and compressed air tanks, and a rear chamber 12a used for the peripheral arrangement of the equipments required for the operation of the compressed air and fuel systems described hereafter. The skin or outer wall 14 of the fuselage extends behind the torus-shaped part to form the combustion chamber and the jet nozzle 13.

According to the invention, the rest of the space available in the central chamber 12, between the frames 9 and 10, and in the wings 2 and 2a is used for housing the fuel. In said central chamber 12, between the fuselage skin 14 and the ram-jet engine casing 15 are accommodated a rigid tank or hold 16 and a compressed air tank 17.

The tank 16 is torus-shaped as shown in Figs. 5, 6. Its inner wall 18 is formed with circular stiffening ribs and the shape of said inner wall is similar to that of the engine casing. The outer wall 19 of said tank 16 is shaped substantially as the skin 14 of the fuselage and is provided with a relatively large upper opening closed by a cover 20 and with a smaller lower opening closed by a plug 21.

Within the tank 16 is mounted a flexible fuel cell 22 which, when filled up with fuel, nearly occupies the whole inner volume of said tank. Said cell 22 has the form of an open ring, as shown in Fig. 7, to permit it to be introduced into the tank. The ends facing each other of said cell are formed with mating surfaces 24, 25 so curved as to maintain each other radially when the cell is being filled with fuel. Moreover, the cell is provided adjacent its ends with outer strips 26, 27 and inner strips 28, 29. After the cell has been slipped into the tank, the strips 28 and 29, and thereafter the strips 26 and 27, are connected to each other by means of laces, in order to maintain said cell in a torus shape, said lace connection being made through the opening adapted to be closed by the cover 20.

The tank 16 is also provided with an air intake 30 which opens into the space between the wall of said tank and the cell 22. Moreover, said tank is provided with a fuel outlet 31 connected to an immerged hose 32 supported by said tank 16, formed with a plurality of holes and extending within the cell through the lower part of the tank substantially midway between the inner and the outer walls of said tank. Thus the discharge of the cell, under the action of the compressed air admitted into the tank 16 through the air intake 30, takes place without trouble. The opening closed by the plug 21 is a drain orifice, for drawing off, for example, water condensed from the compressed air introduced into the space between the cell and the tank wall. The tank 16 is held in position around the ram-jet engine casing 15 by two ring members 33, 34 welded to said casing 15.

The compressed air tank 17 has the shape of a torus generated by a circle and carries fittings 35, 35a for attaching the wings and fittings 10a for securing it to the frame 10. Said tank is provided with an air outlet 36. The structure of each wing 2, 2a comprises a plurality of ribs 37 whereon is secured the wing skin 38 (Fig. 4). Said ribs are formed with circular openings to accommodate long tapering rigid tanks or holds 39a to 39d of circular cross-section, which nearly occupy the whole space available within the wing. Each one of said tanks, as shown in Fig. 8, comprises an outer metal wall 40 to the larger end of which is welded a piece 41 provided with an air inlet 42 and in which is mounted a connecting fitting 43 formed with holes 44 connected with a duct 44a, said fitting 43 having mounted thereon a fuel outlet 45 clamped by a cap nut 46 and wherein open said holes 44. The fitting 43 is formed with a flange 47 for securing to said fitting a flexible fuel cell 48 accommodated in the space within the wall 40 and which, when filled with liquid, nearly occupies the whole of said space. A ring 48a stiffens the cell at the point of fixation to the fitting 43.

The duct 44a of the fitting 43 is connected to an immerged hose 49 formed with holes 50 and extending at the middle radius of the cell throughout the length of the tank, so that the cell can be discharged without trouble, under the action of the compressed air fed to the space between said cell 48 and the wall 40, through the duct 42a connected to the air intake 42. A drain plug 51 is provided at the bottom of the tank for drawing off the water condensed from the compressed air within said space.

The immerged hoses 32 and 49 are, preferably, made of synthetic material, such as polyvinyl chloride.

Figure 2:
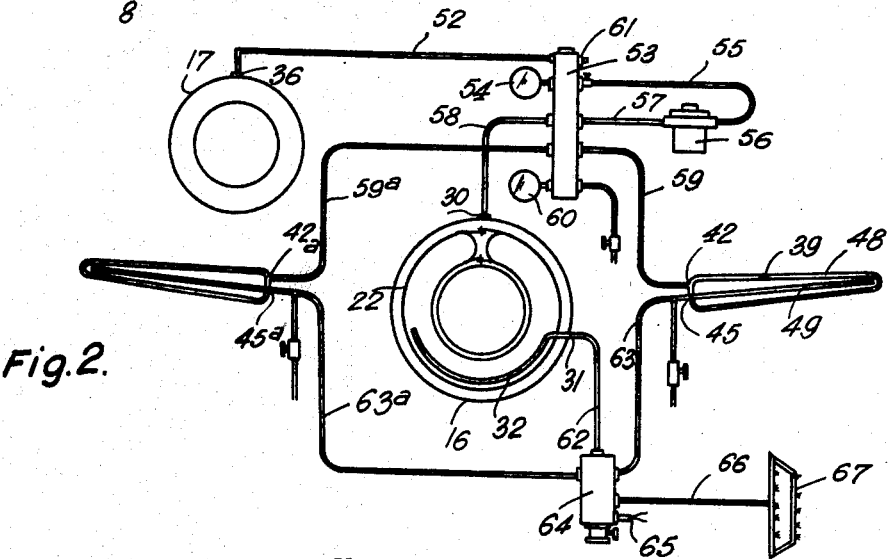
Fig. 2 is a diagrammatical view of the fuel system of the ram-jet engine propelling the aerodyne illustrated in Fig. 1.

Figs. 2 to 4 illustrate the compressed air and fuel systems, including the injection means of the ram-jet engine. For clarity in Fig. 4, the compressed air and fuel pipings connected to the wing tanks are respectively indicated by a thick chain line and a thick dash line.

The inlet 36 of the compressed air tank 17 is connected through a pipe 52 to a compressed air distributor 53. The compressed air arriving through the tube 52, the pression of which is indicated by a manometer 54, flows through said distributor and through a pipe 55 to a pressure reducer 56 wherefrom it flows back to the distributor 53 through a pipe 57. From said distributor the thus expanded low pressure air is fed through a pipe 58 to the inlet 30 of the central tank 16 and through a pair of pipes 59, 59a to the inlets 42, 42a of two sets of tanks 39 accommodated in the wings 2, 2a, the pressure of said expanded air being indicated by a manometer 60. An inlet fitting 61 connected to the pipe 52 is provided in the distributor 53 for filling the compressed air tank 17.

As the expanded air fed through the pipes 58, 59 and 59a acts on the flexible cells 22 and 48 to expel the fuel therefrom, said fuel flows from the central tank 16 through the outlet 31 and the pipe 62 and from the wing tanks through the outlets 45, 45a and the pipes 63, 63a. The pipes 62, 63, 63a are connected to a valve 64 the opening of which is pyrotechnically controlled by a cartridge 65. From this valve 64, the fuel is fed through a pipe 66 to the injection device 67 of the ram-jet engine.

Said injection device 67 comprises a V-shaped fuel feed pipe 68 connected to the pipe 66 and whereon are welded an upstream annular fuel manifold 66 and a downstream annular fuel manifold 70, both made of tubes communicating with the pipe 68. A tubular bracket 71 fixed to a frame 72 of the fulelage supports the injection device assembly in position within the ram-jet engine. At the vertex of the V formed by the feed pipe 68, the latter carriers an injector located in a baffle member 73. The upstream fuel manifold 69 carries injectors 74 and a baffle member 75 co-operating with the injector which is located in the baffle member 73. The downstream fuel manifold 70 carries injectors 76 and baffle members 77 co-operating with the injectors 74. A ring of baffle members 78 co-operating with the injectors 76 are mounted downstream of the downstream manifold 70 by means of tubes 79. A chemical igniter 80 is provided for initiating the combustion of the fuel fed through the injectors for operating the ram-jet engine, said injectors acting as burners.

Figure 12:
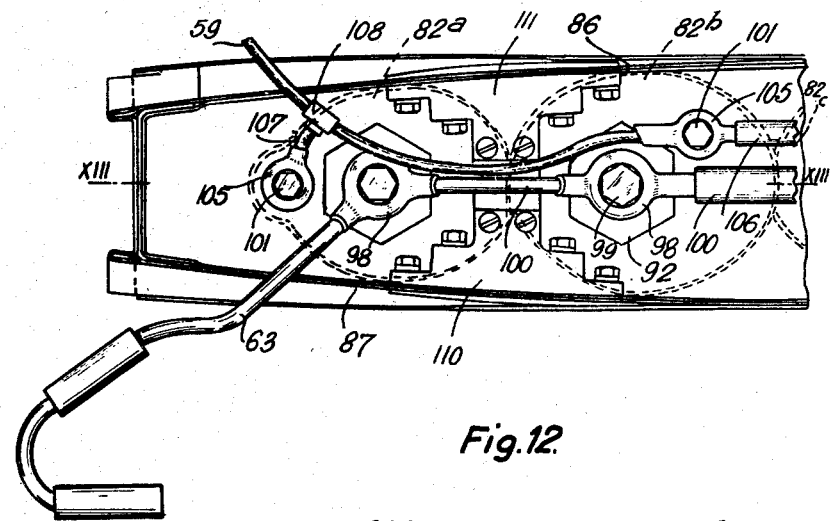
Fig. 12 is a view showing part of the compressed air and fuel systems in the wing illustrated in Fig. 9.
Figure 13:
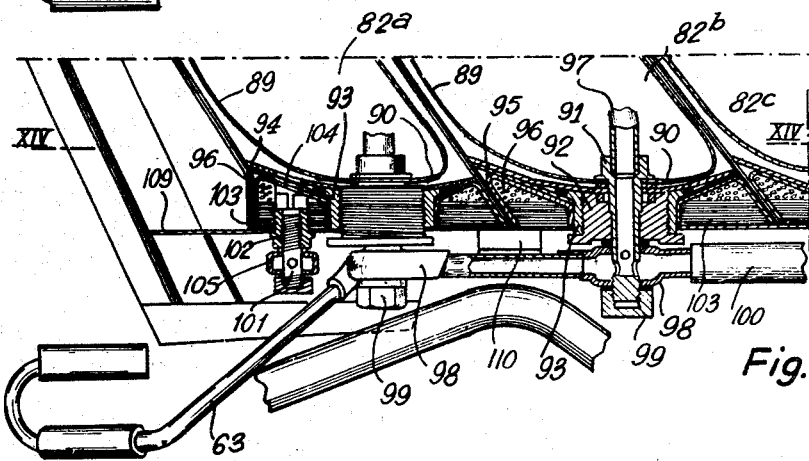
Fig. 13 is a section of Fig. 12 on the line XIII—XIII.
Figure 14:
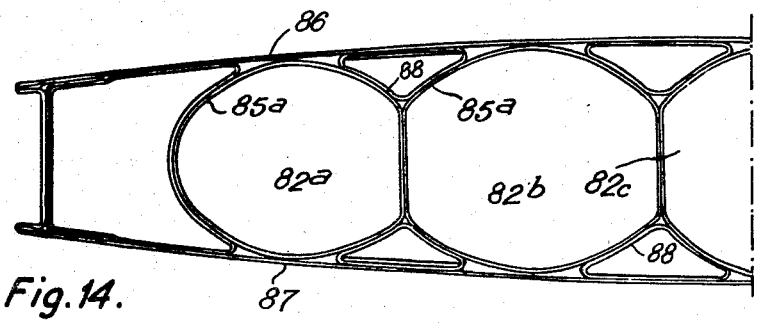
Fig. 14 is a section of Fig. 13 on the line XIV—XIV, it being assumed that the parts included in the air and fuel systems are not yet mounted.

Instead of a composite wing structure as shown in Fig. 4, rigid monobloc wings may be used as illustrated in Figs. 9 to 14. Said wing 81 is made of rigid moulded material and is formed with a series of chambers or holds 82a to 82e extending substantially parallel to the leading edge 83 of the wing, concurring from the wing root towards the wing tip and forming air-tight spaces which may be used directly as the outer walls of tanks to receive the low pressure air used to expel the fuel from flexible fuel cells housed therein and to feed the injectors. Such a wing is preferably made of a rigid laminated material, as described in the co-pending U.S. patent application Serial No. 435,880 filed June 10, 1954, in the name of Charles Joseph Marchetti and assigned to Societe Nationale de Constructions Aeronautiques du Sud-Est. Referring to Figs. 11 and 14, the wing structure is made of a plurality of glass fabric layers 84 impregnated with plastic material and closely bound together by casting plastic material into the mould. Each chamber 82 terminates at the tip of the wing with a rigid part-spherical piece 85 similarly made of one or more layers of glass fabric impregnated with plastic material and stuck to the chamber main body 85a in the moulding operation. The rigid chamber bodies 85a are connected together and with the upper and lower rigid laminated walls 87 of the wing skin by rigid laminated elements 88 (Fig. 14).

Adjacent the wing root, each of the chambers 82a to 82e is formed with a rigid closing partition such as 94 made of one or more glass fabric layers impregnated with plastic material (Fig. 13). Rigid shaped elements such as 95, of similar material, maintain threaded sockets such as 93 and serve as supporting structures for packing elements such as 96 made of impregnated roving and fabric and other packing elements such as 103 so arranged that their fibers extend across with those of the packing elements 96. A rigid stiffening end rib 109 in reinforced plastic material closes the wing structure and ensures the alignment of all the reinforced plastic material elements, which are bound together by finally injecting resin into the mould.

Other elements of glass fabric impregnated with plastic material not shown, extend between the chamber bodies 85a at locations registering with the elements 88 (Fig. 14) to serve as mountings for fixing fittings such as, for example, the fittings 110 and 111 for the rear attachment of the wing on the fuselage.

As shown in Figs. 12 and 13, in each chamber 82 is housed a flexible fuel cell 89 secured through a washer 90 to a flange of the fuel outlet fitting 91. Said fitting 91 is screwed into an intermediate threaded socket 92 which in turn is screwed into the socket 93. The fitting 91 carries the immerged hose 97 extending into the cell and, at its outer end, a tapping piece 98 clamped by a cap nut 99. Pipe elements 100 connect to each other the tapping piece 98 along the row of chambers 82a to 82e. The tapping piece 98 of the first chamber 82a is connected through the pipe 63 to the pyrotechnically controlled valve 64 described above.

Each chamber 82 is also provided with an air intake comprising a hollow nipple 101 screwed into an intermediate threaded socket 102 maintained in the packing 96—103 and opening into space between the bladder 89 and the wall of the chamber 82 through openings 104 provided in the partition 94 and the element 95. Each nipple 101 has associated therewith a connecting fitting 105. Pipe elements 106 connect the fittings 105 to each other along the row of chambers 82b to 82e. The air intake assembly 101–105 of the first chamber 82a is connected through a pipe 107 and a T-fitting 108 to the pipe 59 which feeds air to the first intake fitting 105 of the row of chambers 82b to 82e.

Of course, without departing from the spirit and scope of the present invention, modifications may be made in the embodiment as specified in the appended claims.

What I claim is:

1. Fuel storage means, notably for a pilotless aircraft more particularly utilized as a missile, comprising a rigid hollow tank, a flexible fuel cell freely housed in said tank and independent of the walls thereof and having when filled with fuel substantially the same shape and dimensions as the inner cavity of said tank, a pipe connecting said tank to a source of gaseous fluid under pressure, and a perforated discharge pipe housed in said cell throughout the length of said cell and disposed in the central part of said tank.

2. Fuel storage means, according to claim 1, wherein, when the tank has the shape of a torus having a horizontal axis, the perforated discharge pipe is centrally disposed throughout the lower part of said tank.

3. In a jet-propelled pilotless and tailless aircraft without landing gear, more particularly utilized as missile, and of the kind comprising a hollow annular fuselage carrying on its central part sweptback monoplane wings provided with ailerons, fin and control surfaces, in combination, a tunnel-shaped hollow fuselage having a twin-partitioned front part defining a torus-shaped cavity extending from the fuselage nose to a zone disposed slightly at the rear of the wings, and an assembly for feeding with fuel the jet engine and comprising a main rigid torus-shaped tank housed in the central part of said cavity in registering relationship with said wings, a plurality of rigid wing tanks, flexible fuel cells freely housed in said main and wing tanks and independent of the walls thereof, each flexible cell when filled with fuel having substantially the same shape and the same dimensions as the inner cavity of the corresponding tank, means for applying a pressure on all the outer surface of each flexible cell with a view to collapse said cell in order to expel the fuel contained therein, means for discharging the fuel expelled from each cell notwithstanding the collapse thereof under the pressure applied thereto, fuel pipings interconnecting said discharging means and the jet engine, and means for distributing the fuel from said cells to said engine through said pipings and housed in said torus-shaped cavity at the rear of said torus-shaped tank.

4. A pilotless aircraft, according to claim 3, wherein the inner and outer surfaces of the torus-shaped tank have dimensions substantially equal to those of the two walls limiting the torus-shaped cavity in registering relationship with said tank.

5. A pilotless aircraft, according to claim 3, wherein the wings are composite, each wing comprising a skin, and transverse ribs supporting said skin and having openings aligned on common axes, the wing tanks being elongated and conical and accommodated along said axes through said openings.

6. A pilotless aircraft, according to claim 3, wherein each wing is monobloc, made of a rigid molded material and formed with a plurality of pressure tight cavities directly used as rigid tanks housing the flexible cells.

7. A pilotless aircraft, according to claim 3, wherein the means for discharging the fuel expelled from each flexible cell comprises a perforated discharge pipe housed in said cell throughout the length thereof, said pipe being centrally disposed in each wing tank and centrally disposed throughout the lower part of the torus-shaped tank.

8. A pilotless aircraft, according to claim 3, wherein the means for applying a pressure on all the outer surface of each flexible cell comprises a source of gaseous fluid under pressure for all the cells, and, for each cell, a pipe interconnecting said source and said cell.

9. A pilotless aircraft, according to claim 3, wherein the flexible cell of the torus-shaped tank has the form of an open ring the ends of which facing each other are formed with mating curved surfaces, said cell further carrying strips secured on said facing ends and adapted to be interconnected by means of laces when the cell has been slipped into the tank, in order to maintain said cell in a torus shape.

10. A pilotless aircraft, according to claim 5, wherein the tanks have a circular cross-section.

11. A pilotless aircraft, according to claim 5, wherein the tanks have a polygonal cross-section.

12. In a jet-propelled pilotless and tailless aircraft without landing gear, more particularly utilized as missile, and of the kind comprising a hollow annular fuselage carrying on its central part sweptback monoplane wings provided with ailerons, fin and control surfaces, in combination, a tunnel-shaped hollow fuselage having a twin-partitioned front part defining a torus-shaped cavity extending from the fuselage-nose to a zone disposed slightly at the rear of the wings, and a rear jet nozzle limited by the outer wall of the fuselage, said twin-partitioned front part comprising a removable torus-shaped forward member forming a container for housing the charge to be carried, quick-attaching means adapted to secure said container on the outer surface of the rest of said twin-partitioned part, and structural members partitioning said torus-shaped cavity for defining a central chamber therein, the portion of said torus-shaped cavity comprised between the container and the central chamber being used as a hold for housing the aircraft equipments; a ram-jet engine the outer wall of which is formed by the inner wall of said hollow fuselage and having burners disposed in said hollow fuselage between said front torus-shaped part and the jet nozzle; an assembly for feeding with fuel the jet engine and comprising a main rigid torus-shaped tank housed in the central part of said cavity in registering relationship with said wings, and the outer and inner surfaces of which have dimensions substantially equal to those of the two walls limiting the torus-shaped cavity in registering relationship with said tank, a plurality of rigid wing tanks, flexible fuel cells freely housed in said main and wing tanks and independent of the walls thereof, each flexible cell when filled with fuel having substantially the same shape and the same dimensions as the inner cavity of the corresponding tank, a torus-shaped compressed air tank of circular cross-section disposed in said central chamber at the rear of said torus-shaped tank with flexible cell, a pressure reducer housed in said torus-shaped cavity at the rear of said central chamber and connecting said compressed air tank to said rigid tanks with flexible cells in order to apply a pressure on the outer surfaces of said cells for expelling the fuel contained therein, means for discharging the fuel expelled from each cell notwithstanding the collapse thereof under the pressure applied thereto, and fuel pipings connecting said discharge means to said burners and housed in said torus-shaped cavity at the rear of said central chamber.

13. A pilotless aircraft, according to claim 12, wherein said aerodyne further comprises two fittings for the rear attachment of the wings on the fuselage which are secured on the torus-shaped compressed air tank, and fittings interconnecting said tank and the rear structural member limiting the central chamber, whereby said compressed air tank forms the main frame of the fuselage for the rear attachment of the wings.

14. A pilotless aircraft, according to claim 12, further comprising a valve, and a cartridge connected to said valve for pyrotechnically controlling the opening thereof, said valve being connected to the fuel-pipings issuing from the cells housed in the torus-shaped tank and the wing tanks and to the pipings feeding the burners of the ram-jet engine.

15. A pilotless aerodyne, according to claim 12, wherein the means for discharging the fuel expelled from the torus-shaped cell comprises a perforated discharge hose supported by the main torus-shaped tank, extending throughout the lower portion of said torus-shaped tank at the middle radius thereof within the torus-shaped cell and connected to the piping feeding the ram-jet engine.

16. A pilotless aerodyne, according to claim 12, wherein the wings are composite, each wing comprising a skin, transverse ribs supporting said skin and having openings aligned between the successive ribs on common axes substantially parallel to the leading edge of the wing, and long tapering tanks accommodated along said axes through said openings for housing the flexible wing cells, and wherein the means for discharging the fuel expelled from each one of said cells comprises a perforated discharge hose supported by the corresponding tapering tank extending centrally throughout the length of said tank within said cell and connected to the piping feeding the ram-jet engine.

17. A monobloc wing for aircraft comprising upper and lower rigid laminated walls forming the skin of the wing while defining an opening at the wing root, a plurality of elongated rigid laminated hollow bodies located between said upper and lower walls, part spherical rigid laminated pieces closing said hollow bodies towards the tip of the wing, rigid laminated elements connecting said hollow bodies together and with said upper and lower walls, a rigid laminated partition closing each hollow body adjacent the wing root, a rigid laminated stiffening end rib closing the skin at the wing root, each partition and the part of the end rib facing said partition being formed with at least one orifice, the various rigid laminated walls, bodies, pieces, elements, partitions and end rib being made of a plurality of glass fabric layers impregnated with plastic material and closely bound together by casting plastic material during the molding operation in order to obtain a rigid monobloc device whereby each wing comprises a plurality of tight cavities more particularly usable as holds for fuel.

18. A monobloc wing according to claim 17, wherein the cavities concur toward the wing tip.

19. A monobloc wing for aircraft propelled by a ram-jet engine the fuel feeding of which is effected under the action of compressed air, comprising a rigid molded body having a plurality of longitudinal dead cavities opening near the wing-root, a rigid closing device molded in the same material as said body and adapted to close the openings of said cavities in a tight manner, and, for each cavity, a pipe connecting said cavity with the compressed air source, a flexible cell containing the fuel, secured on said closing device, freely housed in said cavity without connection with its walls and having a shape conformed to that of said cavity, and a perforated discharge hose carried by said closing device, extending centrally throughout the length of said cavity within the cell and connected to the fuel-piping feeding the ram-jet engine.

20. A monobloc wing for aircraft propelled by a ram-jet engine the fuel feeding of which is effected under the action of compressed air, comprising upper and lower rigid laminated walls forming the skin of the wing while defining an opening at the wing root, a plurality of elongated rigid laminated hollow bodies longitudinally located between said upper and lower walls, part spherical rigid laminated pieces closing said hollow bodies towards the tip of the wing, rigid laminated elements connecting said hollow bodies together and with said upper and lower walls, a rigid laminated partition closing each hollow body adjacent the wing root, a rigid laminated stiffening end rib closing the skin at the wing root, each partition and the part of the end rib facing said partition being respectively formed with two orifices, the various rigid laminated walls, bodies, pieces, elements, partitions and end rib being made of a plurality of glass fabric layers impregnated with plastic material and closely bound together by casting plastic material during the molding operation in order to obtain a rigid monobloc device whereby each wing comprises a plurality of tight cavities, and, for each cavity, a pipe, passing through two corresponding orifices of the partition closing said cavity and of the end rib, and connecting said cavity with the compressed air source, a flexible cell containing the fuel, secured on said closing partition, freely housed in said cavity without connection with its walls and having a shape conformed to that of said cavity, and a perforated discharge hose extending centrally throughout the length of said cavity within the cell, passing through the two other corresponding orifices of said partition and end rib which thus carry said hose, and connected to the fuel-piping feeding the ram-jet engine.

References Cited in the file of this patent

UNITED STATES PATENTS

| | | |
|---|---|---|
| 2,124,867 | Akerman | July 26, 1938 |
| 2,505,798 | Skinner | May 2, 1950 |
| 2,519,393 | Noyes | Aug. 22, 1950 |
| 2,523,312 | Leboime et al. | Sept. 26, 1950 |
| 2,590,009 | Hannum | Mar. 18, 1952 |
| 2,621,719 | Eaton | Dec. 16, 1952 |
| 2,653,780 | Pepersack | Sept. 29, 1953 |
| 2,691,495 | Chiroky | Oct. 12, 1954 |
| 2,700,337 | Cumming | Jan. 25, 1955 |
| 2,736,356 | Bender et al. | Feb. 28, 1956 |
| 2,773,792 | Nebesar | Dec. 11, 1956 |
| 2,776,100 | Breguet | Jan. 1, 1957 |

FOREIGN PATENTS

| | | |
|---|---|---|
| 778,685 | Great Britain | July 10, 1957 |